United States Patent [19]

Johnson

[11] Patent Number: 4,894,157
[45] Date of Patent: Jan. 16, 1990

[54] PROCESS FOR PRODUCING SUPPORTED CELLUOSIC MEMBRANES AND PRODUCTS

[75] Inventor: James S. Johnson, Acton, Mass.

[73] Assignee: Micron Separations, Inc., Westborough, Mass.

[21] Appl. No.: 103,960

[22] Filed: Oct. 5, 1987

[51] Int. Cl.$^4$ ............................................. B01D 31/00
[52] U.S. Cl. ................................ 210/490; 210/500.3; 427/245; 264/45.8; 264/46.4
[58] Field of Search ................ 210/500.29, 500.3, 490, 210/508; 427/245; 264/41, 45.8, 46.4

[56] References Cited

U.S. PATENT DOCUMENTS

| | | | |
|---|---|---|---|
| 3,285,765 | 11/1966 | Cannon | 427/245 |
| 3,522,335 | 7/1970 | Rowley | 210/500.3 |
| 3,524,753 | 11/1964 | Sharp | 427/245 |
| 3,607,329 | 9/1971 | Manjikian | 210/500.3 |
| 3,648,845 | 3/1972 | Riley | 210/500.29 |
| 3,762,566 | 10/1973 | Del Pico | 210/490 |
| 3,884,801 | 5/1975 | Kestling | 210/500.29 |
| 3,969,548 | 7/1976 | Hunter et al. | 427/245 |
| 4,183,811 | 1/1980 | Walch et al. | 210/500.29 |
| 4,206,050 | 6/1980 | Walch et al. | 210/500.29 |
| 4,214,994 | 7/1980 | Kitano et al. | 210/500.29 |
| 4,483,771 | 11/1984 | Koch | 210/500.29 |

Primary Examiner—W. Gary Jones
Assistant Examiner—Coreen Y. Lee
Attorney, Agent, or Firm—Kenyon & Kenyon

[57] ABSTRACT

A continuous process for producing a microporous cellulosic membranes supported with an integral nonwoven polymer web by preparing a casting lacquer comprising at least one cellulosic polymer, at least one solvent and at least one non-solvent wherein the casting lacquer is at the point of incipient gelation.

25 Claims, 1 Drawing Sheet

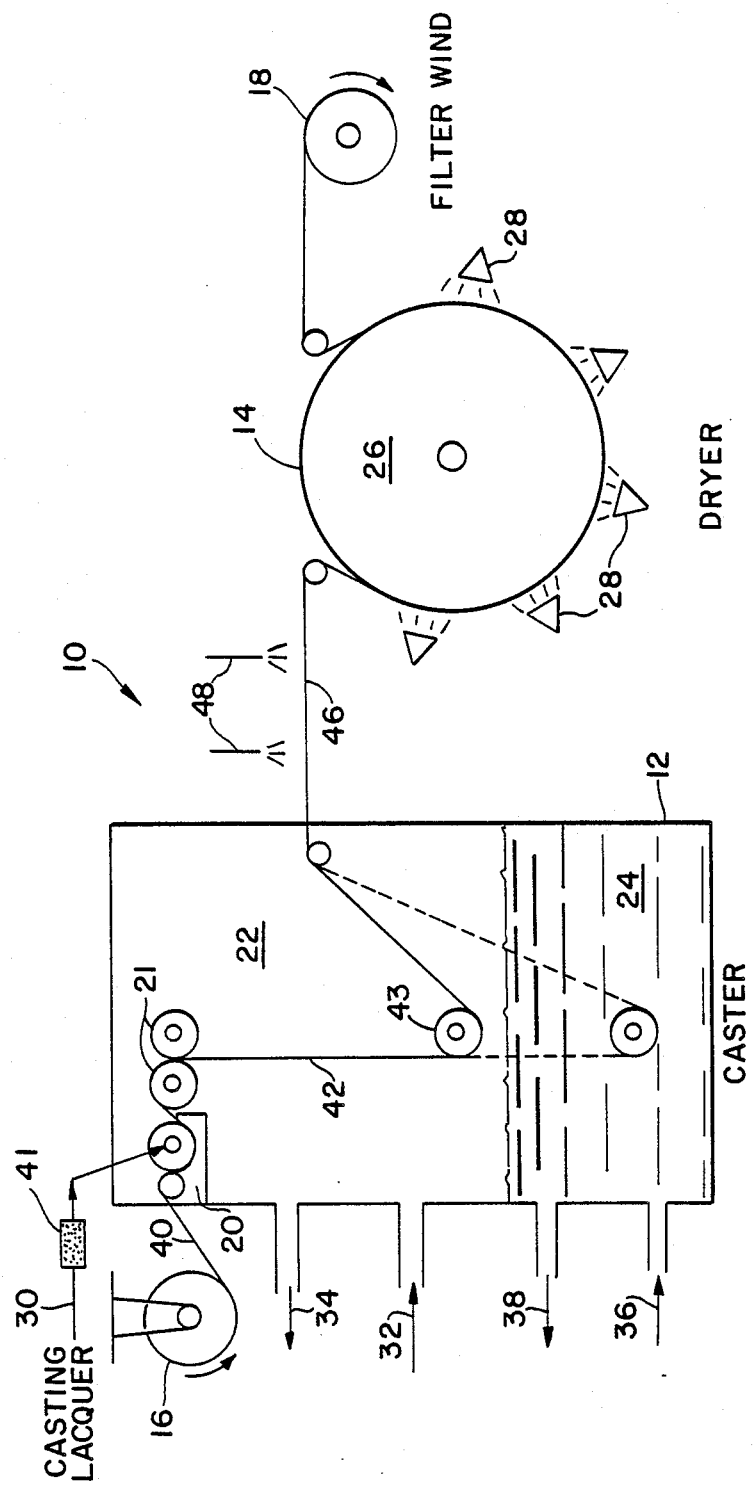

PROCESS FOR PRODUCING SUPPORTED CELLUOSIC MEMBRANES AND PRODUCTS

FIELD OF THE INVENTION

The present invention relates generally to a supported microporous membrane filter and particularly to a supported cellulosic microporous membrane filter suitable for the filtration of biological fluids.

BACKGROUND OF THE INVENTION

Cellulosic polymers have been made into porous membranes and filters for more than a century. Some control of porosity and pore size of such filters was demonstrated around the turn of the century and absolute, integral filters of specific pore sizes were developed and commercialized in the 1950's. It is a tribute to the early developers and researchers that they were able to make integral filters with pore sizes ranging from about 0.1 to 5.0 microns out of cellulose acetate and cellulose nitrate polymers, essentially the very first synthetic polymers ever produced. These newly developed membrane filters had serious property weaknesses, however, with the primary shortcomings being low tensile strength, poor tear resistance, and excessive brittleness. Altering the polymer chain length or degree of substitution as well as effecting other fundamental changes in the basic polymers had little or no effect on these undesirable properties. Likewise, changes in lacquer composition, process rate, temperatures, or other process environmental conditions had not materially improved or affected these filter qualities. In fact, these filters would probably not have achieved commercial success without post-treatment of the filter to improve flexibility and strength as well as very careful product design of devices incorporating these filters to avoid damage. Flexibilizing agents such as glycerine, and wetting agents such as nonionic detergents have become standard additives to cellulosic filters to give them a broader range of applicability and usefulness. However, these additives are almost always undesirable because they are washed out as the filter is used and they wind up as a contaminant in the filtrate or fluid being analyzed. These agents can be reduced or removed prior to filter use by prewashing the filter, but aside from the inconvenience, doubt will remain as to whether all of the contaminants have been totally removed.

Because of the poor tear strength of the cellulosic membranes, their usage was essentially limited to a single test sample before being discarded. Consequently, researchers turned to stronger nylon membranes to enable multiple test samples to be taken with a single membrane. Nylon microporous membranes and the method for preparing same are well known in the art. Generally, the method for producing these microporous membranes include spreading a coating solution of a polymer containing solvent on a substrate to form a thin film thereon, quenching the film in a bath which includes a non-solvent for the polymer, then removing the membrane film from the substrate. The aforementioned quench technique is described in U.S. Pat. No. 3,876,738 to Marinaccio et al.

Other methods for preparing unsupported filters involve the static gelling of a cast film in a high humidity or controlled atmosphere. For example, U.S. Pat. No. 2,783,894 describes a method for preparing nylon membranes by casting polymer solutions on a smooth substrate to form a film, then exposing the film to an atmosphere of a controlled concentration of nonsolvent vapors for an extended period of time to form a gel structure. The above process suffers from a number of commercial disadvantages, one being the difficulty in controlling the nonsolvent atmosphere in a static environment, the other being that the process does not lend itself to continuous production because of the extended gelation time.

Supported or reinforced microporous membranes suitable for biological fluids have only recently appeared, primarily because the development of such membranes have encountered a number of technical problems including non-uniform wetting of the support web, pinholes and air bubbles in the membrane, among others. These preparation problems would generally result in defects in the membranes, such as voids and air pockets which renders the membrane useless for biological testing purposes. In addition, the pressure drop across the supported membrane tends to be too high.

U.S. Pat. No. 4,645,602 issued Feb. 24, 1987 describes a process for producing a reinforced microporous nylon membrane involving casting successive polymeric solutions onto a support web, then quenching the coated web in a nonsolvent quench bath.

In accordance with the present invention, there is provided a novel process for producing supported microporous cellulosic membrane filters which is relatively rapid, easily controllable and adaptable to continuous commercial production. The supported microporous cellulosic membranes of the present invention maintain the desirable flow and filtration characteristics of unsupported cellulose membranes while providing the superior strength of nylon membranes.

OBJECT AND SUMMARY OF THE INVENTION

It is an object of the present invention to provide a novel web supported microporous cellulosic membrane suitable for the filtration of biological liquids and a novel process for producing such membrane.

In accordance with these objectives, there is provided a novel integral, bubble pointable cellulose membrane filter having a fabric support which maintains the integrity of unsupported microporous cellulosic membranes while providing the superior strength and handling characteristics of nylon membranes.

The present invention is further directed to a process for producing the supported microporous membrane filter by coating a support web with a casting lacquer containing at least one cellulosic polymer in such a way as to completely wet and deposit a uniform film of the lacquer on either side of the support web. The film-support web composite proceeds through a gelation chamber where variables such as air flow rate, temperature and vapor composition are controlled to effect precipitation and deposition of the cellulosic polymers throughout the support web under conditions which create a microporous structured membrane. In the preferred embodiment, the membrane is formed through the evaporative loss of solvents and other lacquer components from the film in the gelation chamber without the requirement of quenching or rinsing the composite in solvents or non-solvents. In other embodiments, the gelation chamber may be followed by a liquid rinse to speed up the gelation process or to simply rinse residual non-polymeric components of the casting lacquer. The supported membrane is preferably dried to remove residual volatile components of the casting lacquer or to vaporize and remove the liquid rinse if employed. Optionally, wetting agents or surface coatings may be applied to the supported membrane prior to drying to impart special properties to the supported membrane filter.

In all aspects of the present membrane, it is preferred that the supported membrane be dried to a low residual moisture content to improve storage life and to prevent bacterial growth.

The microporous membrane filters according to the present invention preferably have pore sizes ranging from 0.1 to 5.0 microns. The desired pore size is primarily controlled by varying the composition of the casting lacquer, i.e. by varying the relative proportions of polymers, solvents and nonsolvent pore formers.

The supported cellulosic microporous membrane filter of the present invention exhibits the superior strength and handling characteristics of nylon membrane filters without sacrificing the performance and functionality attributable to conventional unsupported cellulosic membranes.

BRIEF DESCRIPTION OF THE DRAWING

The drawing is an elevational schematic of a casting system used for producing a supported microporus cellulosic membrane filter according to the process of the present invention.

DETAILED DESCRIPTION OF THE INVENTION

The supported microporous cellulosic filter according to the present invention comprises an integral support web and a cellulosic polymer coating on either side of the support web. The support web for the microporous filter is a porous material pervious to a casting lacquer comprised of cellulosic polymers, solvents and non-solvents. The support web is preferably a nonwoven pure polymeric material, for example, nylon, polyester, polypropylene, among others, and has a preferred density of 0.5 to 1.5 oz. per square yard. Lower density materials are generally weaker and less uniform in thickness, while higher density fabrics require greater amounts of lacquer and increased gelation times for complete encapsulation of the support web. Depending on the specific application of the microporous filter, the support web may be of any reasonable thickness approximating the desired final filter thickness. However, it has been found that for most applications structurally preferred filters are obtained from support webs having thicknesses up to about 0.005 inch. A support web having a thickness less than 0.005 inch is generally more flexible while thicker support webs naturally require more polymer and have increased surface area for the same pore size and structure. It has also been found that support webs having thickness greater than 0.005 inch are suitable as a solid phase support biotechnology applications.

Specific commerical examples of non-woven materials suitable for use as a support web are Reemay Polyester and Typar Polypropylene, manufactured by Dupont; Hollytex from Filtration Sciences; Webril Polyester, Nomex and nylon from Kendall; Cerex nylon from Monsanto and Chicopee's Kiara polypropylene.

The web supported cellulosic membrane filter is preferably prepared by first coating a casting lacquer containing at least one cellulosic polymer onto the support web in a metered fashion so as to completely saturate the web and to leave a lacquer film of uniform thickness on either side of the support web.

The casting lacquer is generally prepared by dissolving at least one membrane forming cellulosic polymer in a suitable solvent, then adding non-solvent pore formers. The preferred membrane forming polymers are cellulose ester, cellulose ether, nitrocellulose, or blends of these polymers. Specific examples of commercially available cellulosic polymers are Hercules 35 second viscosity nitrocellulose and Eastman cellulose acetate. The solvents employed in the casting lacquer may be any volatile organic solvent in which the cellulosic polymers are readily dissolvable such as acetone, ethyl acetate and methylene chloride among others. The non-solvent pore formers are non-solvent for the cellulosic polymers but must be miscible with the polymer solution. Non-solvent pore formers which can be used in the casting lacquer include water, butanol, ethanol, and the like.

Other non-volatile materials such as glycerine, glycols, polyglycols, and the like may also be dissolved in the casting lacquer to impart particular desirable properties to the filter. The non-solvent pore formers are selected on the basis of the solvent utilized.

The casting lacquer described above should comprise at least about 5 to 20 weight percent cellulosic polymers, preferably about 12 weight percent of the casting lacquer. It is also preferred that the weight ratios of solvent to non-solvent be about 0.5 to 8.0 for these casting lacquers. Other nonvolatile materials may be present in the lacquer in minor quantities to impart specific desirable properties to the filter.

Generally, it has been found that the membrane micropore size can be controlled by varying the relative proportions of the casting lacquer components. Specifically, smaller membrane micropores can be achieved by either increasing the cellulosic polymer percentage or by increasing the ratio of solvent to non-solvent at a fixed polymer percentage. In accordance with the present invention, the casting lacquer composition may be varied to produce microporous membranes having pore sizes ranging from about 0.1 micron to about 5.0 micron.

The preferred method of making the web supported microporous membrane filter is by first impregnating and coating the support web in a specifically designed apparatus with a sufficient amount of casting lacquer prepared according to the present invention under conditions of temperature and pressure to ensure penetration and deposition of the casting lacquer on either side of the web. Other factors contributing to the quality of the membrane filter include the angle of contact of the support web with the casting lacquer, and the rate at which the lacquer is applied to the support web.

The actual formation of a membrane from the liquid casting lacquer is a "phase inversion process". The casting lacquer is a single phase liquid with fully dissolved cellulosic polymers which is preferably at the point of incipient gelation or precipitation. Upon coating the support web with a lacquer film of uniform thickness, the volatile components of the casting lacquer, i.e. acetone, alcohol, and water, evaporate from the film until a semi-solid gel is formed and continue to evaporate until only the support web and cellulosic polymeric membrane remain with perhaps some residual moisture. Thus a solid polymer phase is formed identical in composition to the orginal celluloic polymers prior to dissolution in the solvent.

In essence, it is the controlled evaporation of the volatile components of the casting lacquer that induces micropore formation and results in the microporous cellulosic membrane filter of the present invention. The environment under which the volatile components are evaporated will affect the rate of loss of the solvents which, in turn, can have a substantial effect on the formation of pores within the membrane. Once the filter has gelled to a semi-solid on the support web, it may optionally be immersed in a non-solvent liquid rinse, e.g. water, to speed the gelation process. If the liquid rinse is employed, the solvent evaporation time can be reduced and the supported membrane filter can be handled more vigorously even though residual solvent may be contained in the membrane. After the phase inversion is complete, the web supported membrane filter is dried by conventional dryers and wound for storage. Optional surface coatings may be applied prior to drying to impart desired filter qualities.

The process of the present invention is best performed in the casting system 10 depicted in the drawing. As seen, the casting system 10 essentially comprises a caster 12, a dryer 14, a support web supply roll 16, and a filter windup roll 18.

The caster 12, includes a roll coater 20, a gelation chamber 22, and optionally, a rinse chamber 24. The dryer 14 may be a conventional dryer including a drum 26 over which the supported microporous filter travels, and a series of heaters 28 for final solvent evaporation prior to collecting the filter on the windup roll 18. A line 30 is provided for supplying the casting lacquer to the roll coater 20. Lines 32 and 34 provide an air inlet and exit, respectively, for the gelation chamber 22. Lines 36 and 38 provide for a rinse fluid feed and removal, respectively, at the rinse chamber 24.

In essence, the process of the present invention is conducted by delivering a support web 40 from supply roll 16 to the roll coater 20 in the caster 12. The caster 12 is maintained relatively gas tight requiring that the support web enter the caster 12 through a seal or plenum (not shown) to prevent the composition controlled atmosphere in the gelation chamber 22 from escaping. The pre-formulated casting lacquer is fed through a filter 42 in line 30 before supplying a coating head (not shown) in the rolling coater 20. The lacquer roll coater 20 saturates the support web 40 with the casting lacquer and leaves a fluid-film of uniform thickness on either side of the support web without entrapping air or vapor bubbles. Commercial coating equipment may be employed for this purpose or may be modified to achieve the desired properties of the microporous membrane filter. The fluid-film is cast at thicknesses ranging from about 0.003 to 0.015 inches, on either side of the support web 40 depending on the desired thickness of the microporous membrane filter. The fluid-film thickness may be controlled by means of static blades (not shown) or by metering rolls 21. In the drawing, the lacquer coated support web is shown passing between metering rolls 21 which are precisely gapped to provide the desired fluid-film thickness.

The lacquer coated support web 42 is then conveyed through the gelation chamber 22 wherein the volatile components of the casting lacquer evaporate from the fluid-film to initially form a gel. The temperature of the gelation chamber 22 is variable over a wide range, however, depending on the polymeric concentration in the casting lacquer, the temperature should be higher than the point of incipient precipitation of the polymers.

Specifically, the casting lacquer is preferably formulated such that the cellulosic polymers are marginally soluble at the casting temperature and upon cooling of the fluid-film, via evaporation, the cellulosic polymers cannot be maintained in solution and gelation commences. The formulating temperature is determined by the relative proportions of cellulosic polymers, solvents and non-solvents in the casting lacquer.

The evaporation proceeds in the gelation chamber 22 until only a microporous polymeric membrane and support web remain with perhaps some residual moisture. The temperature, pressure and composition of the environment in the gelation chamber 22 affects the evaporation rate of the volatile components of the casting lacquer, thereby determining the residence time, i.e., the dwell time, of the support web in the gelation chamber. The casting and gelation steps of the present invention may be carried out over a wide range of temperatures and pressures in accordance with the present invention. However, the preferred operating conditions are ambient temperature and pressure for ease of operation. Depending on the specific casting lacquer composition, higher temperatures may be employed to aid in the dissolution of the cellulosic polymers in the solvent.

The composition of the gelation chamber environment is preferably controlled by varying the air flow rate and its quality, e.g. temperature, humidity, through the gelation chamber via lines 32 and 34.

It has also been found that controlling the vapor composition in the gelation chamber 22 and thus the evaporation rate of specific solvents or nonsolvents serves to control the membrane micropore size. For example, a high concentration of solvent vapor, i.e. acetone, could be maintained in the gelation chamber to slow the evaporation rate of solvent from the fluid-film and thereby affect the pore size of the membrane.

It has been found that at about room temperature, humidification of the air flow through the gelation chamber to a level of about 80%, while maintaining a minimum air flow rate of about 30 CFM ensures a gelation chamber environment rich in both solvent and nonsolvent vapors. This high solvent environment has resulted in improved microporous membrane filter properties as well as improved process control. It has also been found that elevating the air temperature to about 90° F., which allows for a higher absolute humidity, compensates for the heat loss due to solvent evaporation and results in better process control but at the expense of higher energy consumption.

A gelation chamber dwell time as short as about 60 seconds at ambient conditions has been found to provide a microporous membrane filter with superior properties. However, longer dwell times could be employed for improved process control at the expense of larger equipment, i.e. a larger gelation chamber.

In the preferred embodiment of the present invention, the support web, encapsulated in a substantially solid cellulosic polymer, is held in tension by rollers 43 and 44 and exits the caster 12 for final processing (the support web is illustrated as solid line in this embodiment). The web supported microporous membrane filter 46 is fed around the drum 26 of dryer 14 where it is exposed to a series of heaters 28. The drying temperature for the membrane filter 46 should be sufficient to remove residual lacquer components without burning or damaging the membrane surface. Preferably this temperature is from about 150° to 300° F., to minimize drying time. Following the drying step, the microporous filter is wound for storage on the filter windup 18. Optionally, the microporous membrane filter exiting the caster 12 may be treated with agents via nozzles 48 to impart desired surface properties, for example, glycerine to improve suppleness or wetting agents to enhance wettability.

In an alternate embodiment of the present invention, a liquid rinse may be applied to the support web 42 prior to the final drying step. As shown by the broken line in the drawing, the support web 42 is conveyed from the gelation chamber 22 to the rinse chamber 24 prior to exiting the caster 12. A rinse fluid in chamber 24 is a nonsolvent to the cellulosic polymer and serves to speed up the removal of residual solvents from the semisolid membrane on the support web 42. Therefore, employment of the liquid rinse has the added benefit of reducing the dwell time in the gelation chamber 22. The rinse fluids according to the present invention are any nonsolvent fluids such as, water, alcohols, mixtures of alcohols and water and freons, among others, the preferred economical choice being water. The drying step and optional surface coating step are identical to those described in the aforementioned preferred embodiment.

The following examples of the novel web supported cellulosic membrane filter according to the present invention are presented to illustrate the applicaiton of the inventive principles but are not intended to restrict or limit the claims of this invention. All percentages given are by weight unless otherwise specified.

EXAMPLE 1

Preparation Of The Casting Lacquer (A) A solid polymeric mixture comprising cellulosic nitrate, and cellulose acetate, were dissolved in acetone at 23° C. to which was added ethanol, butanol and glycerol to form a casting lacquer having the following composition: 7.8% cellulose nitrate, 1.2% cellulose acetate, 54% acetone, 22% ethanol, 13% butanol and 2% glycerol.

(B) A casting lacquer was produced according to (A) except that the proportions were modified to produce the following formulation: 7.0% cellulose nitrate, 1.0% cellulose acetate, 38% acetone, 32% ethanol, 20% butanol and 2% glycerol.

EXAMPLE 2

Supported Membrane Filter Manufacture (A) The casting lacquer prepared in Example 1(A) was coated onto a polyester support using the casting system shown in the drawing and described above in the preferred embodiment. Three ounces of casting lacquer per square yard of support was applied to produce an 0.2 micron pore size membrane filter.

(B) The casting lacquer prepared in Example (B) was similarly coated onto a polyester support using three ounces of casting lacquer per square yard of support to produce a 3.0 micron pore size membrane filter.

EXAMPLE 3

Using the procedure of Example 2, a series of web supported cellulosic filters were prepared having a wide range of pore sizes within a narrow range of thicknesses. Performance data is reported for the web supported cellulosic filters as well as for conventional unsupported film cellulosic filters having comparable pore sizes only. The results are given in Table I in which flow rates through the filters are compared at a differential pressure of 10 PSID.

TABLE I

| Example | Thickness (um) | Bubble[1] Point (psi) | Pore[3] Size (um) | Flow Rate[2] Web Support Filter (cm/min) | Flow Rate[2] Conventional Film Cellulosic Filter (cm/min) |
|---|---|---|---|---|---|
| 1 | 80 | 15 | 1.0 | 157 | 165 |
| 2 | 73 | 23 | 0.5 | 74 | 98 |
| 3 | 80 | 33 | 0.45 | 39 | 36 |
| 4 | 87 | 45 | 0.3 | 23 | 21 |
| 5 | 88 | 54 | 0.22 | 17 | 16 |

[1] Bubble point is the air pressure necessary to force water from the largest pore in a water wet filter in pounds per square inch.
[2] Flow rate is the rate of pure, clean water flow through a filter under the noted pressure differential in milliliters per square centimeter of filter area per minute.
[3] Pore size is determined from bubble point using capillarity calculations and a historical data base.

As apparent, the web supported cellulosic membrane filters produced in accordance with present invention, exhibit substantially the same or better flow rates than conventional unsupported cellulosic membrane.

In addition, the supported cellulosic membrane filters produced by this invention possess high tensile and shear strength compared to conventional cellulosic film filters, thus affording the filter of this invention applications where large-size filters are desirable.

The invention in its broader aspects is not limited to the specifically described embodiments or examples and departures may be made therefrom within the scope of the accompanying claims without departing from the principles of the invention and without sacrificing its chief advantages.

We claim:

1. A continuous process for producing an integral, bubble pointable microporous cellulosic membrane filter having an integral support web embedded therein, comprising:
   (a) preparing a casting lacquer comprising at least one cellulosic polymer, at least one solvent for the polymer, and at least one non-solvent pore former wherein the casting lacquer is at the point of incipient gelation;
   (b) conveying a non-woven polymer support web through the casting lacquer from step (a) so as to effect complete wetting of the web and coating of the lacquer as a fluid-film of uniform thickness on either surface of the web;
   (c) conveying the film coated web through an environmentally controlled atmosphere for a time sufficient to effect evaporation of the solvent and nonsolvent pore formers and gelation of the cellulosic polymer occurs, thereby forming a microporous cellulosic membrane on either side of the web; and (d) drying the membrane coated support to remove residual solvents and non-solvent.

2. The process of claim 1 wherein said cellulosic polymer is selected from the group consisting of cellulose ester, cellulose ether, nitrocellulose and blends thereof.

3. The process of claim 1, wherein the casting lacquer further comprises non-volatile additives for imparting specific properties to the filter.

4. The process of claim 1, wherein the support web is selected from the group consisting of nylon, polyester, polypropylene, polyethylene and cellulose.

5. The process of claim 1, wherein the solvent in the casting lacquer is selected from the group consisting of acetone, methyl ethyl ketone, methylene chloride and ethyl acetate.

6. The process of claim 1, wherein the non-solvent is selected from the group consisting of water, butanol, ethanol, propanol and glycerol.

7. The process of claim 1, wherein the cellulosic polymeric concentration in the casting lacquer is within the range from about 5 to about 20 percent by weight.

8. The process of claim 7 wherein said cellulosic polymer is selected from the group consisting of cellulose ester, cellulose ether, nitrocellulose and blends thereof.

9. The process of claim 7, wherein the casting lacquer further comprises non-volatile additives for imparting specific properties to the filter.

10. The process of claim 7 wherein the support web is a non-woven pure polymeric substrate.

11. The process of claim 10, wherein the support web is selected from the group consisting of nylon, polyester, polyprolylene, polyethylene and cellulose.

12. The process of claim 7, wherein the solvent in the casting lacquer is selected from the group consisting of acetone, methyl ethyl ketone, methylene choride and ethyl acetate.

13. The process of claim 7, wherein the non-solvent is selected from the group consisting of water, butanol, ethanol, propanol and glycerol.

14. The process of claim 1, wherein the casting lacquer comprises two cellulosic polymers selected from the group consisting of cellulose ester, cellulose ether and cellulose nitrate.

15. The process of claim 14, wherein the casting lacquer comprises cellulose acetate and cellulose nitrate at a concentration from about 5 to about 20 percent by weight.

16. The process of claim 1, wherein the solvent to non-solvent ratio in the casting lacquer is within the range from about 0.5 : 1 to about 8 : 1.

17. The process of claim 1, wherein the environmentally controlled atmosphere is at ambient temperature and pressure, having a relative humidity of 60% to 90%.

18. The process of claim 1, wherein the cast fluid-film has a thickness of about 50 to 300 microns.

19. The process of claim 1, wherein the microporous cellulosic membrane has a pore size of from about 0.1 to about 5.0 microns.

20. The process of claim 1, wherein the solvent in the casting lacquer is acetone at a concentration within the range of 30 to 70 weight percent, the non-solvents are butanol and ethanol at a concentration within the range of from about 30 to 70 percent combined, and the polymers are cellulose acetate and cellulose nitrate having a concentration in the casting lacquer within the range from about 5 percent to about 20 percent.

21. A continuous process for producing a microporous cellulosic membrane filter having an integral support web embedded therein, comprising:
   (a) preparing a casting lacquer comprising at least one cellulosic polymer, at least one solvent for the polymer, and at least one non-solvent pore former wherein the casting lacquer is at the point of incipient gelation;
   (b) conveying a non-woven pervious support web through the casting lacquer from step (a) so as to effect complete wetting of the web and coating of the lacquer as a fluid film of uniform thickness on either surface of the web;
   (c) conveying the film coated web through an environmentally controlled atmosphere for a time sufficient to effect evaporation of the solvent and non-solvent pore formers and gelation of the cellulosic polymer occurs, thereby forming a microporous cellulosic membrane on either side of the web;
   (d) conveying the microporous cellulosic membrane coated support web through a rinse chamber comprising a nonsolvent rinse liquid to the cellulosic polymer for removing residual solvents from the microporous cellulosic membrane; and
   (e) drying the membrane coated support web at elevated temperature to remove residual solvents and rinse liquid.

22. A continuous process for producing a microporous cellulosic membrane filter having an integral support web embedded therein, comprising:
   (a) forming a casting lacquer having at least two cellulosic polymers selected from the group consisting of cellulose ester, cellulose ether and cellulose nitrate, in a mixture of at least one solvent and at least one nonsolvent for the polymers prepared in a proportion and at a temperature whereat the casting lacquer is at the point of incipient gelation;
   (b) conveying a non-woven polymer pervious support web through the casting lacquer from step (a) so as to effect wetting of the web and casting of the lacquer as a fluid film of uniform thickness on either side of the web;
   (c) conveying the film coated web through an environmentally controlled atmosphere including vapors of solvent and nonsolvent at ambient temperature and for a time sufficient to evaporate the solvent and nonsolvent from the film to effect formation of a microporous cellulosic membrane on either side of the web; and
   (d) drying the membrane coated support web to remove residual solvents and nonsolvents.

23. A continuous process for producing an integral bubble pointable microporous cellulosic membrane filter consisting essentially of at least one cellulosic polymer and an integral support web embedded therein, comprising the steps of:
   (a) preparing a casting lacquer comprising at least one cellulosic polymer, at least one solvent for the polymer, and at least one non-solvent pore former wherein the casting lacquer is at the point of incipient gelation;
   (b) conveying a non-woven polymer support web through the casting lacquer from step (a) so as to effect complete wetting of the web and coating of the lacquer as a fluid-film of uniform thickness on either surface of the web;

(c) conveying the film coated web through an environmentally controlled atmosphere for a time sufficient to effect evaporation of the solvent and non-solvent pore formers and gelation of the cellulosic polymer, thereby forming a microporous cellulosic membrane on either side of the web; and (d) drying the membrane coated support web to remove residual solvents and non-solvent.

24. A supported microporous cellulosic membrane comprising:

a pervious non-woven support web; and a microporous cellulosic membrane on either side of the support web and extending therethrough, wherein the cellulosic membrane has uniform micropores which extend through the support web and are in the range of about 0.1 micron to 5.0 micron made by casting at the point of incipient gelation.

25. A supported microporous cellulose membrane filter having a previous non-woven support web and a microporous cellulosic membrane on either side of the web and extending therethrough, produced by the process of claims 1, 16 or 23.

* * * * *